United States Patent
Li et al.

(10) Patent No.: US 12,254,099 B2
(45) Date of Patent: Mar. 18, 2025

(54) AUTOENCRYPTION SYSTEM FOR DATA IN A CONTAINER

(71) Applicant: International Business Machines Corporation, Armonk, NY (US)

(72) Inventors: Fang Tai L Li, Beijing (CN); Zhi Li Guan, Beijing (CN); Guo Liang Huang, Beijing (CN); Jia Nan Zhang, Beijing (CN); Heng Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 17/444,733

(22) Filed: Aug. 9, 2021

(65) Prior Publication Data
US 2023/0037986 A1   Feb. 9, 2023

(51) Int. Cl.
*G06F 21/60* (2013.01)
*G06F 21/64* (2013.01)
*G06F 21/78* (2013.01)

(52) U.S. Cl.
CPC ............ *G06F 21/602* (2013.01); *G06F 21/64* (2013.01); *G06F 21/78* (2013.01)

(58) Field of Classification Search
CPC ........ G06F 21/602; G06F 21/64; G06F 21/78; G06F 21/53
See application file for complete search history.

(56) References Cited

U.S. PATENT DOCUMENTS

| | | | |
|---|---|---|---|
| 9,887,836 B1* | 2/2018 | Roth | H04L 9/088 |
| 10,326,744 B1* | 6/2019 | Nossik | H04L 63/0435 |
| 10,911,225 B2 | 2/2021 | Bunch et al. | |
| 11,477,165 B1* | 10/2022 | McDowall | G06F 9/45558 |
| 2007/0100913 A1* | 5/2007 | Sumner | G06F 21/6245 |
| 2007/0256140 A1 | 11/2007 | Venters, III et al. | |
| 2008/0320319 A1* | 12/2008 | Muller | G06F 21/6209 |
| | | | 713/193 |
| 2016/0294791 A1 | 10/2016 | Detcheverry et al. | |
| 2016/0359622 A1* | 12/2016 | Bunch | H04L 67/1097 |
| 2016/0359955 A1* | 12/2016 | Gill | H04L 67/10 |
| 2017/0149737 A1 | 5/2017 | Betzler et al. | |
| 2017/0249128 A1* | 8/2017 | Fojtik | G06F 8/71 |
| 2018/0309747 A1 | 10/2018 | Sweet et al. | |
| 2019/0158537 A1* | 5/2019 | Miriyala | G06F 21/606 |
| 2019/0394219 A1* | 12/2019 | Huang | G06F 9/455 |
| 2020/0099515 A1* | 3/2020 | Hopkins | H04L 9/14 |
| 2020/0220848 A1 | 7/2020 | Patwardhan | |

(Continued)

OTHER PUBLICATIONS

"Identify", Dictionary.com, Published Nov. 26, 2020, Retrieved from the Wayback Machine (Year: 2020).*

(Continued)

*Primary Examiner* — Michael R Vaughan
*Assistant Examiner* — Ethan V Vo
(74) *Attorney, Agent, or Firm* — Yee & Associates, P.C.

(57) ABSTRACT

A method that manages sensitive data. A computer system identifies the sensitive data for a group of application containers using configuration information for the group of application containers. The computer system encrypts the sensitive data identified for the group of application containers to form encrypted sensitive data. The computer system saves the encrypted sensitive data to a shared storage used by the group of application containers when the group of application containers is deployed.

20 Claims, 14 Drawing Sheets

(56) References Cited

U.S. PATENT DOCUMENTS

| | | |
|---|---|---|
| 2020/0236108 A1 | 7/2020 | Mital et al. |
| 2020/0278813 A1* | 9/2020 | Nilsson ................ G06F 3/0604 |
| 2021/0096776 A1* | 4/2021 | Kim ...................... G06F 3/067 |
| 2021/0209250 A1* | 7/2021 | Prgin ................. G06F 21/6254 |
| 2021/0271763 A1* | 9/2021 | Perlman ............... G06F 21/602 |
| 2021/0271777 A1* | 9/2021 | Netsch ................... G06F 9/455 |
| 2021/0279353 A1* | 9/2021 | Du .......................... G06F 21/53 |
| 2022/0006787 A1* | 1/2022 | Bursell ................ H04L 9/3073 |
| 2022/0012373 A1* | 1/2022 | Kulkarni ............... G06F 21/602 |
| 2022/0286269 A1* | 9/2022 | Wasserman ............ H04L 9/002 |

OTHER PUBLICATIONS

Mell et al, "Recommendations of the National Institute of Standards and Technology," National Institute of Standards and Technology, U.S. Department of Commerce, Special Publication 800-145, Sep. 2011, 7 pages.

* cited by examiner

```
800
data{
  group_baw:{
    {
      "type": "secret",                                              — 805
      "cr_path": "baw_configuration.admin_secret_name",              — 806
      "attributelist": "sslKeyPassword, dbPassword",                 — 808    ← 802
      "env_names": "SSL_PWD, DB_PWD",                                — 810
      "algorithm": "aes"                                             — 812
    },
    {
      "type": "configmap",                                           — 814
      "cr_path": "ums_configuration.custom_security_config",         — 816
      "attributelist": "customprop1, customprop2",                   — 818    ← 804
      "algorithm": "hash"                                            — 820
    }
  }
  ......
}
```

FIG. 8

AUTOENCRYPTION SYSTEM FOR DATA IN A CONTAINER

BACKGROUND

1. Field

The disclosure relates generally to an improved computer system and more specifically to a method, apparatus, computer system, and computer program product to automatically encrypting data for use in containers.

2. Description of the Related Art

Containers are decoupled from the underlying infrastructure. Containers virtualize processor units, memory, storage, and network resources at an operating system level. In other words, containers use operating system virtualization such that multiple containers can run on the same operating system kernel.

Sensitive data is an important consideration for customers using a cloud platform. Sensitive data can include information such as passwords, authentication tokens, secure shell protocol (SSH). Containers can use this information to perform operations that include accessing other systems or resources. It is undesirable to store this information as plaintext in a container. Sensitive information can be encrypted. The sensitive data is manually encrypted in the deployment code for application containers.

For example, the sensitive data can be encrypted with the encrypted sensitive data being stored in an object such as a secret in Kubernetes. Kubernetes is an open source container orchestration system that can be used to automate computer application deployment, scaling, and management. The developer of Kubernetes is the Cloud Native Computer Foundation (CNCF). The deployment code for the container includes a reference to the secret and key to unencrypt the encrypted sensitive data.

This sensitive data can change. For example, a new value for a parameter can change or a new parameter can be added. With these changes, the changed sensitive information needs to be manually encrypted in the deployment code. For example, the containers are coded to reference a secret that stores the encrypted sensitive data. If sensitive data changes, the change in the sensitive data is encrypted and placed into another secret. In this case, the deployment code for the containers is changed to reference the new secret containing the updated encrypted sensitive data.

Further, application developers and sensitive data managers can be different entities. When the sensitive data is changed by the manager of the sensitive data, the application developers often do not know that a change has occurred until an issue is encountered and reported the running of the containers for application. As result, the application may not run properly until the deployment code is changed and the containers are redeployed for the application.

SUMMARY

According to one illustrative embodiment, a computer implements a method for managing sensitive data. A computer system identifies the sensitive data for a group of application containers using configuration information for the group of application containers. The computer system encrypts the sensitive data identified for the group of application containers to form encrypted sensitive data. The computer system saves the encrypted sensitive data to a shared storage used by the group of application containers when the group of application containers is deployed. According to other illustrative embodiments, a computer system and computer program product for managing sensitive data are provided.

As a result, the illustrative embodiments provide a technical effect and practical application in the field of sensitive data management by enabling automation of encrypting sensitive data using a shared encrypting service and supporting customization in encrypting sensitive data.

The illustrative embodiments also determine whether a change has occurred in the sensitive data after the sensitive data for the group of application containers was encrypted to form the encrypted sensitive data, and re-encrypt the sensitive data with the change to form updated encrypted sensitive data in response to a determination that the change to the sensitive data has occurred. The encrypted sensitive data is updated with the updated encrypted sensitive data. The updated encrypted sensitive data can be used by the group of application containers. As a result, the illustrative embodiments can ensure that the sensitive data remains up-to-date for use by a container for an application, reducing issues of containers running while using out of date sensitive data. Further, the illustrative embodiments can avoid the need to change the programing for the container and restart the container when the encrypted sensitive data changes.

BRIEF DESCRIPTION OF THE DRAWINGS

FIG. 8 is an illustration of configuration information in accordance with an illustrative embodiment;

DETAILED DESCRIPTION

Figure 1:
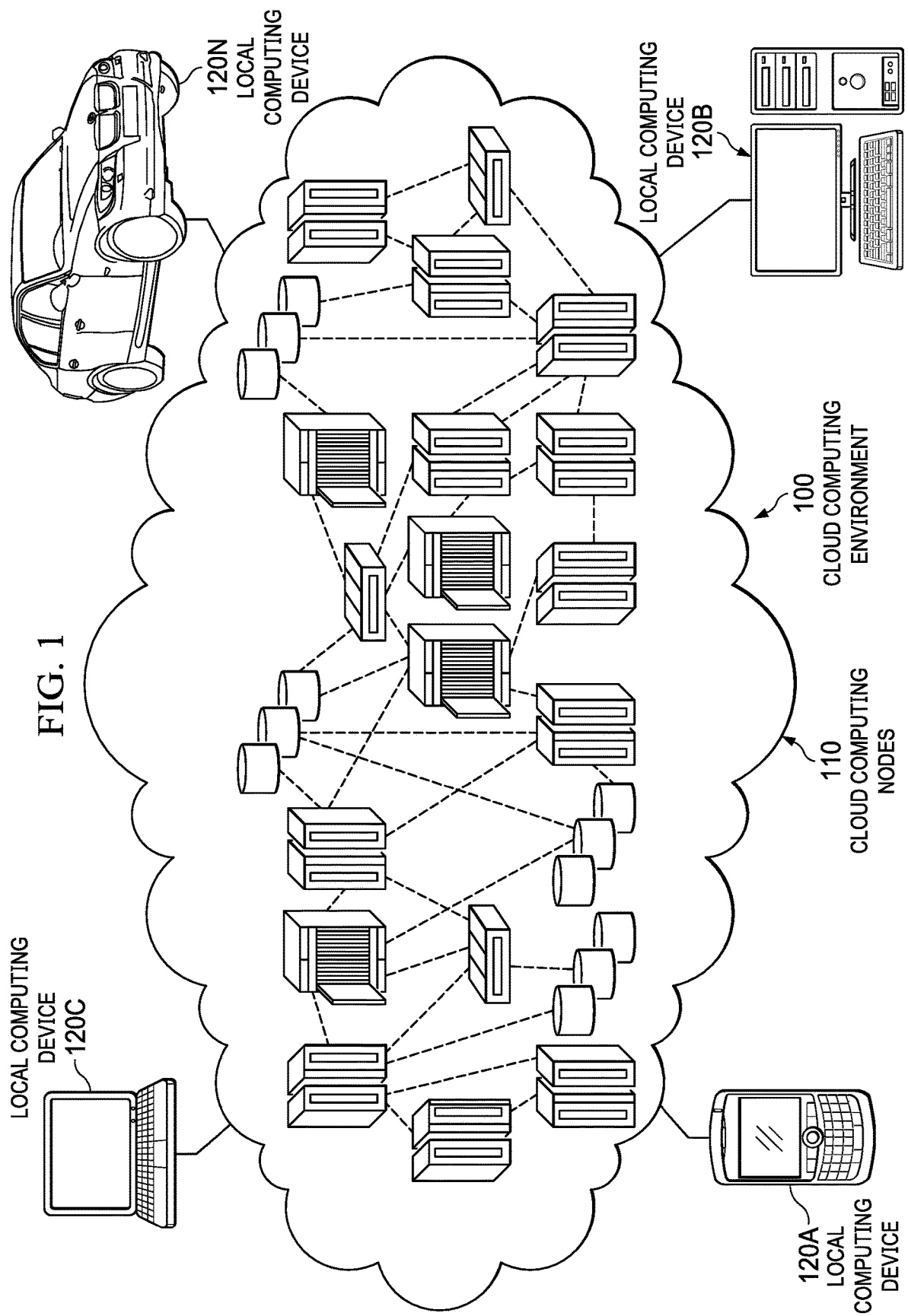
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, illustrative embodiments provide a method, apparatus, system, and computer program product for automatically encrypting sensitive data. In the illustrative embodiments, sensitive data can be obtained from a location identified in configuration information. The sensitive data can be automatically encrypted using configuration information and stored during the deployment of containers for an application. The illustrative embodiments also recognize and take into account that changes in the sensitive data can be detected in which the sensitive data can be automatically encrypted and automatically deployed for use by the containers for the application. This detection of changes to sensitive data can be detected using checksums.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
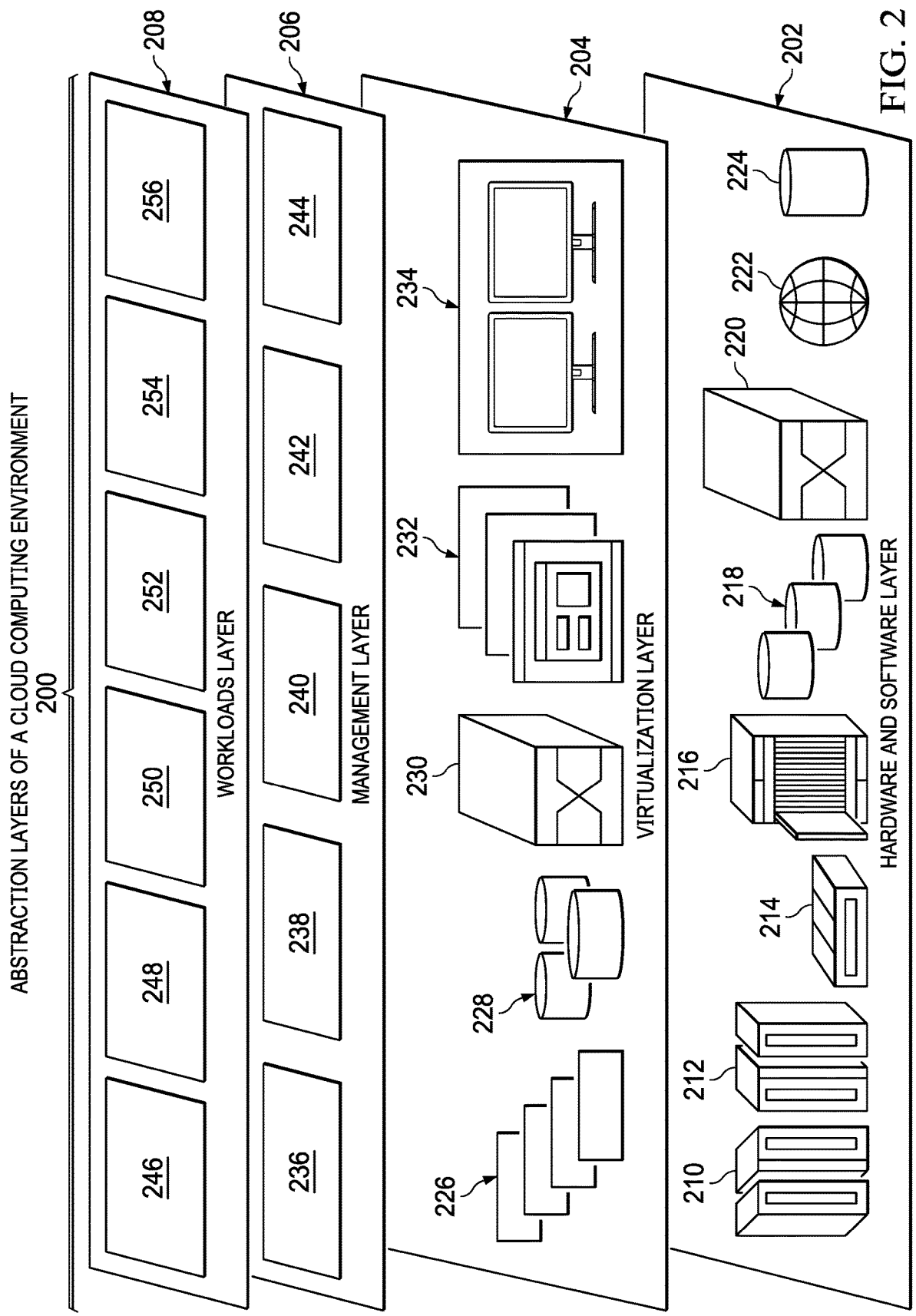
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and container orchestration 256.

In this example, container orchestration 256 provides a service for managing the deployment of applications in cloud computing environment 100 in FIG. 1 or a network in a physical location that accesses cloud computing environment 100 in FIG. 1. In the illustrative example, container orchestration 256 can provide automated application deployment scaling and management. For example, container orchestration 256 can automate the deployment, scaling, and operations of application containers across different clusters of hosts. An application container is a container that at least one of a process or function for an application.

Figure 3:
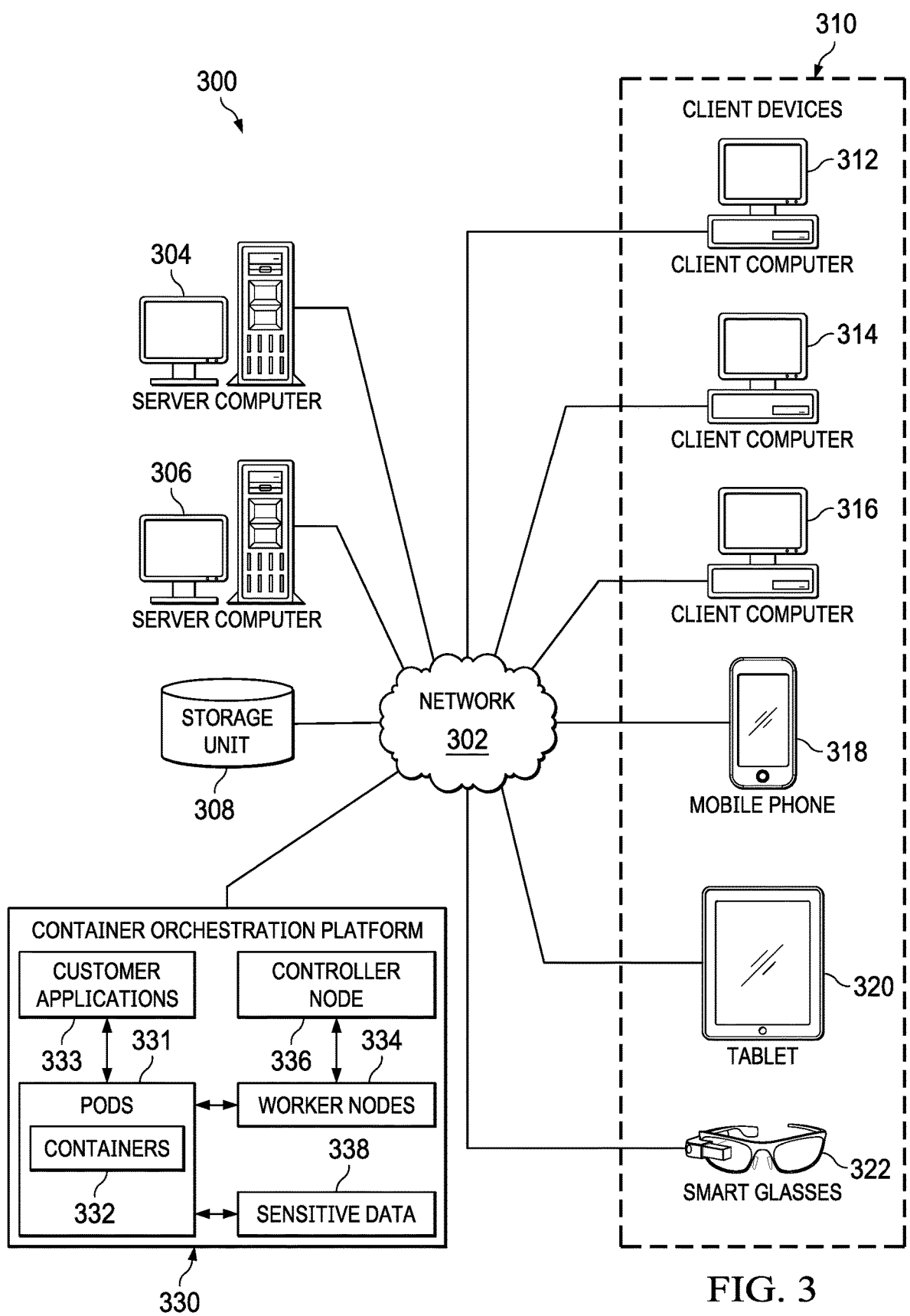
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Container orchestration platform 330 may be, for example, a Kubernetes® architecture, environment, or the like. However, it should be understood that description of illustrative examples using Kubernetes is meant as an example architecture only and not as a limitation on illustrative embodiments. Container orchestration platform 330 can also be referred to as a container orchestration system.

Container orchestration platform 330 provides a platform for automating deployment, scaling, and operations of customer applications. Container orchestration platform 330 also provides automatic deployment, scaling, and operations of pods 331. Each pod in pods 331 comprises a number of containers 332 running customer application workloads for customer applications 333 across cluster of worker nodes 334. These worker nodes are also referred to as known as host nodes or minions. While the term "pod" is generally used in the Kubernetes paradigm, the term as used herein is not limited to that environment but rather refers to any grouping of a number of containers 332 where workloads are deployed and hold the running applications, libraries, and their dependencies.

A container is a standard unit of software for an application that packages up program instructions and all its dependencies, so the application can run on multiple computing environments. A container isolates software from the environment in which the container run and ensures that the container works uniformly in different environments. A container for an application can share the operating system kernel on a machine with other containers for other applications. As a result, an operating system is not required for each container running on the machine.

Controller node 336 corresponds to cluster of worker nodes 334 that performs customer application workloads. Controller node 336 receives and tracks service requests from client device users requesting performance of services corresponding to customer applications 333. Controller node 336, which is a main controlling unit of cluster of worker nodes 334, manages the cluster's customer application and directs communication across the cluster. A worker node in worker nodes 334 is a machine, either physical or virtual, where containers for applications are deployed. While the terms "controller node" and "worker node" are generally used in the Kubernetes paradigm, these terms as used herein are not limited to that environment but rather refer to any type of nodes that are capable of controlling and running customer applications 333.

In this illustrative example, container orchestration platform 330 can manage sensitive data 338, which is used by a number of containers 332 in pods 331 running on worker nodes 334. The management of sensitive data 338 can be performed in a manner that increases protection of sensitive data 338 while providing flexibility for updating sensitive data 338 used by containers 332.

Figure 4:
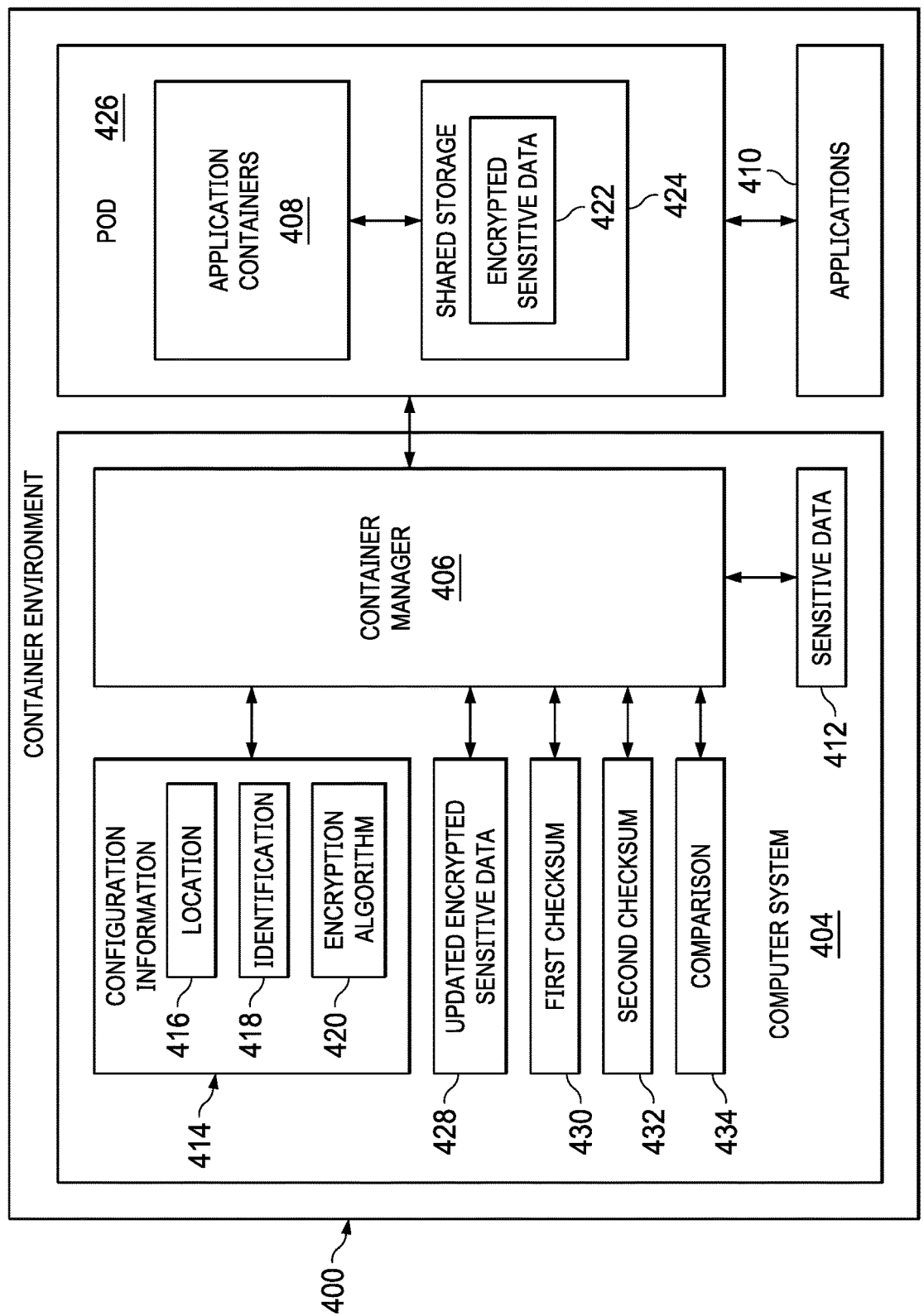
FIG. 4 is a block diagram of an application management environment in accordance with an illustrative embodiment.

With reference now to FIG. 4, a block diagram of an application management environment is depicted in accordance with an illustrative embodiment. In this illustrative example, container environment 400 includes components that can be implemented in hardware such as the hardware shown in cloud computing environment 100 in FIG. 1 and network data processing system 300 in FIG. 3.

In this illustrative example, Container environment 400 includes computer system 404 and container manager 406. As depicted, container manager 406 is located in computer system 404. In this illustrative example, container manager 406 system can operate to manage a group of application containers 408 for a number of applications 410. Container manager 406 can operate to manage sensitive data 412 used by the group of application containers 408 for the number of applications 410.

As used herein, a "group of" when used with reference to items means one or more items. For example, a group of application containers 408 is one or more application containers.

Container manager 406 can be implemented in software, hardware, firmware, or a combination thereof. When software is used, the operations performed by container manager 406 can be implemented in program instructions configured to run on hardware, such as a processor unit. When firmware is used, the operations performed by container manager 406 can be implemented in program instructions and data and stored in persistent memory to run on a processor unit. When hardware is employed, the hardware may include circuits that operate to perform the operations in container manager 406.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 404 is a physical hardware system and includes one or more data processing systems. When more than one data processing system is present in computer system 404, those data processing systems are in communication with each other using a communications medium.

The communications medium can be a network. The data processing systems can be selected from at least one of a computer, a server computer, a tablet computer, or some other suitable data processing system.

In this illustrative example, container manager 406 manages sensitive data 412 used by a group of application containers 408 in a manner that reduces errors and increases the speed at which changes to sensitive data 412 can be propagated to application containers 408. Container manager 406 can identifying sensitive data 412 for a group of application containers 408 using configuration information 414 for the group of application containers 408. Configuration information 414 can comprise a location 416 of sensitive data 412, an identification 418 of sensitive data 412 for encryption, and encryption algorithm 420 for encrypting sensitive data 412.

Location 416 can be, for example, a secret, a configmap, a database, a data store, a file, or some other location in which sensitive data 412 can be located. Additionally, location 416 can identify a number of objects in which sensitive data 412 can be located. For example, location 416 can identify a first secret, a second secret, and a configmap as objects in which sensitive data 412 can be located. In other words, sensitive data 412 can be present in more than one object identified by location 416.

Identification 418 identifies sensitive data 412 from other sensitive data or information that may be present at location 416. Encryption algorithm 420 identifies the type of encryption can be performed on sensitive data 412 to generate encrypted sensitive data 422. For example, encryption algorithm 420 can be, for example, advanced encryption standard (AES), advanced encryption standard 256, Rivest-Shamir-Adleman (RSA), data encryption standard (DES), and other suitable encryption methods. Thus, with configuration information 414, container manager 406 can identify what sensitive data 412 is to be used by group of application containers 408 and location 416 of sensitive data 412.

This illustration of configuration information 414 is not meant to limit the invention to these types of information for managing sensitive data 412. For example, encryption algorithm 420 can be omitted in some implementations. For example, standard encryption method and encryption level can be set as a default. In another example, location 416 can be expanded location in which sensitive data 412 can be found.

In this illustrative example, container manager 406 can encrypt sensitive data 412 identified for the group of application containers 408 to form encrypted sensitive data 422. In encrypting sensitive data 412 to form encrypted sensitive data 422, container manager 406 can encrypt sensitive data 412 using an encryption algorithm 420 specified by the configuration information 414 for the group of application containers 408 to form the encrypted sensitive data 422.

Container manager 406 can save encrypted sensitive data 422 to shared storage 424 used by the group of application containers 408 when the group of application containers 408 is deployed. In this illustrative example, shared storage 424 can be any storage that is accessible by the group of application containers 408.

For example, shared storage 424 can be a volume in pod 426 in which the group of application containers 408 are located. In one illustrative example, shared storage 424 can be an emptyDir volume that is first created when pod 426 is assigned a node and exist as long as pod 426 runs on the node. In this depicted example, emptyDir volume is initially empty and all containers in pod 426 can read and write the same files. This volume be managed at the same or different path for each container in pod 426. Thus, when shared storage 424 take the form of a volume, container manager 406 can save encrypted sensitive data 422 to be volume used by the group of application containers 408.

In this illustrative example, container manager 406 can take into account that sensitive data 412 can change over time while the group of application containers 408 for an application in applications 410 are running. For example, container manager 406 can determine whether a change has occurred to sensitive data 412 periodically or in response to an event that maybe nonperiodic. For example, nonperiodic event can be a user-initiated check for changes. As another example, nonperiodic event can be an access to the storage in which sensitive data 412 is located.

As depicted, container manager 406 can determine whether a change has occurred in sensitive data 412 after sensitive data 412 for the group of application containers 408 was encrypted to form encrypted sensitive data 422. Container manager 406 can re-encrypt sensitive data 412 that has been changed to form updated encrypted sensitive data 428 in response to a determination that the change to sensitive data 412 has occurred. Container manager 406 can update encrypted sensitive data 422 with the updated encrypted sensitive data 428. In this example, updated encrypted sensitive data 428 is used by the group of application containers 408. As result, the group of application containers 408 do not use versions of sensitive data 412.

A determination as to whether a change has occurred can be made in a number of different ways. For example, the sensitive data 412 has first checksum 430 generated prior to or when encryption of sensitive data 412 occurs to form encrypted sensitive data 422. Container manager 406 can generate second checksum 432 for sensitive data 412 at a time after the generation of first checksum 430. With these two checksums, container manager 406 can compare first checksum 430 to second checksum 432 to form comparison 434. Container manager 406 can use comparisons of the checksums to determine whether a change has occurred in sensitive data 412.

If comparison 434 indicates that the checksums are the same, then no change has occurred. If comparison 434 indicates that the checksums are different, and a change has occurred, an encryption of sensitive data 412 can be performed to generate updated encrypted sensitive data for 428 for use by the group of application containers 408.

In illustrative examples, a change in sensitive data 412 can occur in a number of different ways. For example, new sensitive data can be added to sensitive data 412. For example, new sensitive data can be added sensitive data 412 through a new secret added to the secrets currently containing sensitive data 412. This new sensitive data can be an additional password for a new resource. In another illustrative example, the change can occur with a name change to an attribute name in sensitive data 412. For example, an attribute name "dbPassword" can change to dbKeyPassword". As another example, the value the sensitive can change. For example, a database password in sensitive data 412 can change. These changes can be handled by updating configuration information 414. In this manner, changes to the code for deployments and containers do not need to be changed. Additionally, the change can be made without needing to restart containers for the application.

In illustrative examples, container manager 406 can handle these different types of changes to sensitive data 412 automatically without needing additional work. The change in sensitive data 412 can be handled based on updated configuration information 414 in the different illustrative examples.

Figure 5:
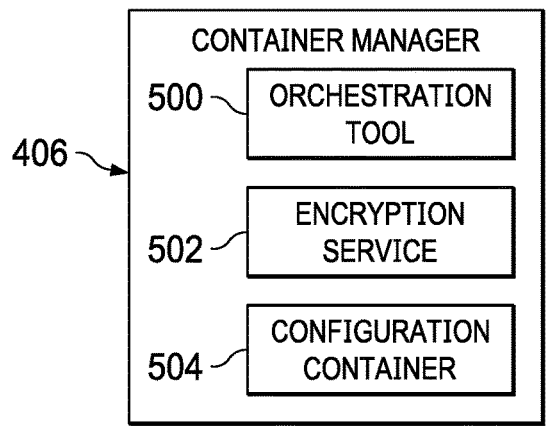
FIG. 5 is an illustration of a container manager in accordance with an illustrative embodiment.

Turning next to FIG. 5, an illustration of a container manager is depicted in accordance with an illustrative embodiment. In this figure, an example of one implementation for container manager 406 is shown. As depicted, container manager 406 can comprise orchestration tool 500, encryption service 502, and configuration container 504.

Orchestration tool 500 is a software component that can manage the deployment and operation of containers. Orchestration tool 500 performing automated configuration, coordination, and management of containers such as application containers 408 in FIG. 4. Orchestration tool 500 can be used in any environment in which application containers 408 can run. Orchestration tool 500 can take a number of different forms. For example, orchestration tool 500 can be for example, Google Kubernetes Engine (GKE), Helm, Operator, Docker Swam, and other suitable tools.

Encryption service 502 is a service that can be deployed by orchestration tool 500. Configuration container 504 can be used as part of the deployment of an application in applications 410 in FIG. 4 using the group of application containers 408. In this illustrative example, configuration container 504 can be added as part of the deployment of containers and other resources for an application that is deployed that is deployed for pod 426 in FIG. 4. Configuration container 504 can begin running before the application containers to obtain encrypted sensitive data and store this encrypted sensitive data in a local shared storage that can be used by the application container.

In the illustrative example, configuration container 504 operates to buy and managed encrypted sensitive data 422 in FIG. 4. Configuration container 504 is in contrast to an application container in the group of application containers 408, which operate to perform workloads for an application. Configuration container 504 can take a number of different forms. For example, configuration container 504 can be one of an init container and a sidecar container when container manager 406 is implemented using a container orchestration platform such as Kubernetes.

With this example, configuration container 504 is deployed in pod 426 in FIG. 4 and runs before the group of application containers in pod 426. Configuration container 504 can call encryption service 502 to obtain encrypted sensitive data 422 and store encrypted sensitive data 422 in shared storage 424 in FIG. 4. Encryption service 502 can identify and encrypt sensitive data 412 in response to receiving the request for encrypted sensitive data 422 from configuration container 504.

Computer system 404 in FIG. 4 can be configured to perform at least one of the steps, operations, or actions described in the different illustrative examples using software, hardware, firmware, or a combination thereof. As a result, computer system 404 operates as a special purpose computer system in which container manager 406 in computer system 404 enables improved protection of sensitive data used by application containers 408 as compared to current techniques for handling sensitive data.

For example, container manager 406 transforms computer system 404 into a special purpose computer system as compared to currently available general computer systems that do not have container manager 406. In illustrative example, container manager 406 in computer system 404 enables sensitive data protection with greater automation and reduced errors. In one illustrative example, container manager 406 enables flexibility in selecting sensitive data for use with application containers. Further, container manager 406 also enables updating encrypted sensitive data stored in the pod in response to changes in sensitive data used to generate encrypted sensitive data.

Thus, one or more illustrative items can increase the automation in application for application as well reducing issues with application containers when sensitive data or the exact notification change. Further, one or more illustrative examples can automate the updating of encrypted sensitive data accessed by the application containers in response to changes in the sensitive from which the encrypted sensitive data was derived.

Further, one or more illustrative examples illustrative examples increase security by protecting sensitive data without exposing sensitive data as environmental variables by placing encrypted sensitive data within the shared storage. In one or more illustrative examples, encryption of sensitive data can occur automatically configuration containers. Further, one or more illustrative examples increase compatibility occurs with the ability to automatically handle sensitive data changes that occurred during upgrades.

The illustration of container environment 400 and the different components in container environment 400 in FIG. 4 and FIG. 5 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, container manager 406 can be used to manage sensitive data for multiple applications involved. As another example, when more than one application containers present with application containers 408, each application container can have information in encrypted sensitive data 422. As another example, the group of application containers 408 can be more than one application container for an application in applications 410.

Figure 6:
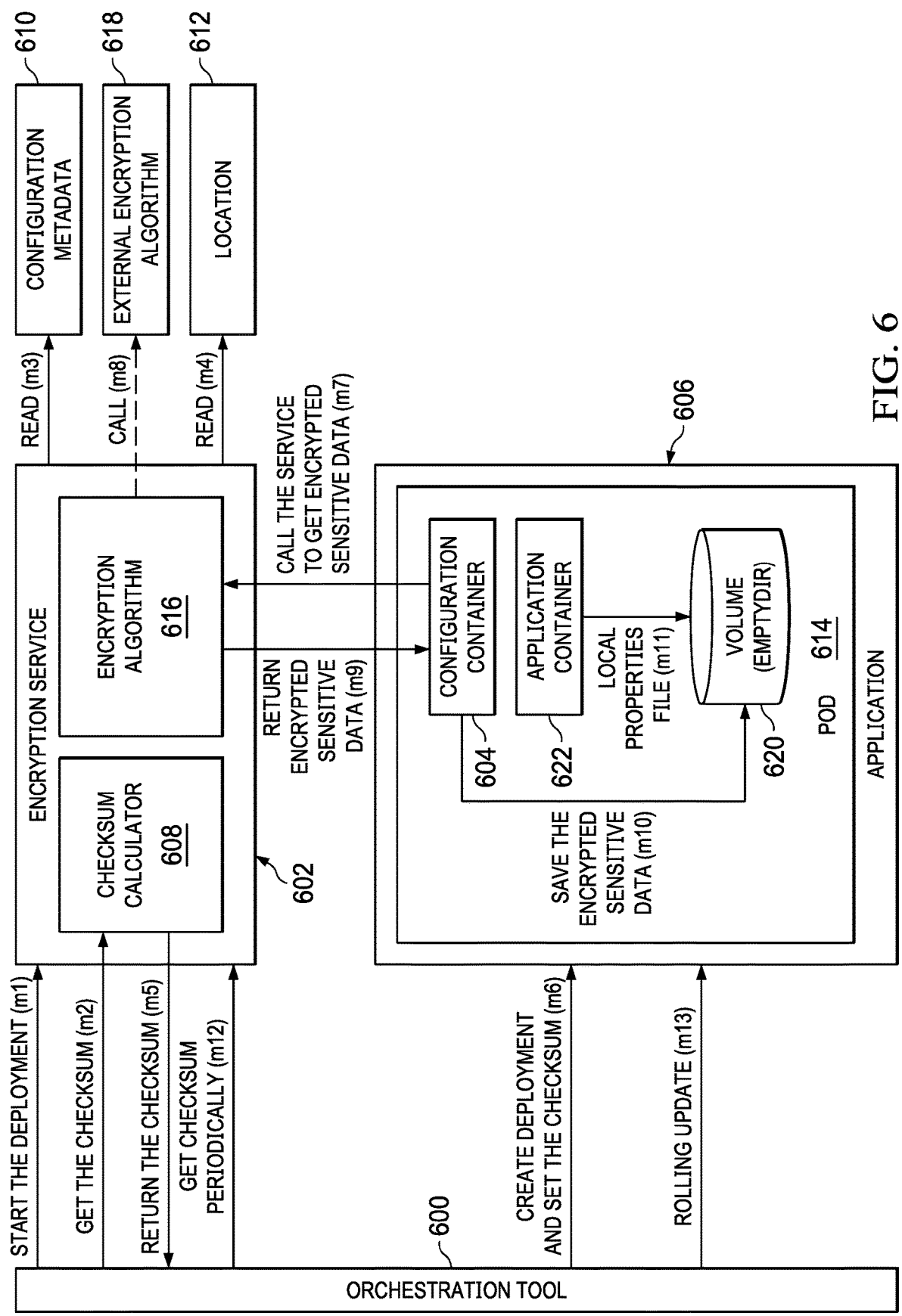
FIG. 6 is a message flow diagram of steps performed manage sensitive data for an application container in accordance with an illustrative embodiment.

With reference now to FIG. 6, a message flow diagram of steps performed manage sensitive data for an application container is depicted in accordance with an illustrative embodiment. In this illustrative example, orchestration tool 600, encryption service 602, and configuration container 604 are examples of orchestration tool 500, encryption service 502, and configuration container 504, respectively, in FIG. 5 for example implementation of container manager 406 in FIG. 4 and FIG. 5.

In this illustrative example, orchestration tool 600 starts an encryption deployment for encryption service 602 such that encryption service 602 is available for use in managing sensitive data (step m1). In step m1, a deployment is a process that can manage a pod in which one or more containers run. A deployment can be a management tool for pods. Although a deployment is described in this example, other illustrative examples may use other types of management tools. For example, a statefulset can also be used, which is a management tool similar to a deployment but is especially well-suited for stateful apps.

Orchestration tool 600 makes request to get the checksum (step m2) for the deployment of application 606. This message is received by checksum calculator 608 in encryption service 602.

In turn, encryption service 602 reads configuration metadata 610 (step m3). Configuration metadata 610 is an example of configuration information 414 in FIG. 4. Configuration metadata 610 enables encryption service 602 to identify what fields or pieces of data for the sensitive data will be encrypted as well as the location of these fields for pieces of data.

Encryption service 602 reads the sensitive data in location 612 (step m4). Location 612 can point to an object such as, for example, a secret, a config map, or some other suitable data structure. In illustrative example, location 612 can be more than one object. For example, location 612 can be three secrets and a configmap.

After reading the sensitive data in location 612, encryption service 602 uses checksum calculator 608 to generate a checksum for the identified sensitive data, which can be, for example, first checksum 430 in FIG. 4. This checksum is returned to orchestration tool 600 (step m5).

In this illustrative example, orchestration for 600 starts an application deployment and sets the checksum in the metadata for the application deployment (step m6). In this illustrative example, the checksum is stored in the application deployment that manages application 606. This checksum can be used in comparisons for later determination as to whether the sensitive data has changed.

The application deployment creates pod 614 for application 606 and configuration container 604 begins running in pod 614. Configuration container 604 is initialized as part of the deployment of application 606. Configuration container 604 calls encryption service 602 to obtain encrypted sensitive data (step m7). In this depicted example, the call is received by encryption algorithm 616 in encryption service 602.

Encryption algorithm 616 encrypts the sensitive data in location 612 identified using configuration metadata 610. The type of encryption algorithm for encrypting the sensitive data can be determined from configuration metadata 610. In this illustrative example, encryption algorithm 616 can perform encryption of the sensitive data. Optionally, encryption algorithm 616 can call external encryption algorithm 618 to encrypt sensitive data (step m8). Encryption algorithm 616 returns encrypted sensitive data to configuration container 604 in pod 614 (step m9).

As depicted, configuration container 604 can save encrypted sensitive data to volume 620 (step m10). This encrypted sensitive data can be stored in a local properties file in volume 620, which is available for use by other containers in pod 614, such as application container 622.

In this illustrative example, application container 622 can load the local properties file from volume 620 (step m11). The local properties file can be exported as environment variables or mounted for use by application container 622. As depicted, configuration container 604 can use the encrypted sensitive data because application container 622 has the key needed to the decrypt encrypted sensitive data. The key for decrypting encrypted sensitive data can be included as part of the deployment of application container 622 in pod 614.

In this illustrative example, orchestration tool 600 can request to get the checksum periodically (step m12). The request can be made to checksum calculator 608 in encryption service 602. This checksum is a new checksum such as second checksum 432 in FIG. 4.

If the checksum exchanged between the first checksum and the second checksum, the sensitive information stored in volume 620 can be updated. In this illustrative example, orchestration tool 600 can make a call to configuration container 604 to perform a rolling update of the encrypted sensitive information (step m13). This rolling update can involve configuration container 604 making another request to encryption service 602 to obtain updated encrypted sensitive data with configuration container 604 storing the updated encrypted sensitive information in volume 620 in place of the current encrypted sensitive data.

Thus, orchestration tool 600 can create encryption service 602 and can periodically request checksums to determine whether a change in sensitive data has occurred. In illustrative example, encryption service 602 can read configuration metadata 610, read sensitive data using configuration metadata 610, calculate a checksum, and encrypt sensitive data in response to a call from at least one of orchestration tool 600 or configuration containers 604. Also, in this example, configuration container 604 can call encryption service 602 to obtain corrected sensitive data and save this encrypted sensitive data into the shared storage such as volume 620.

With these components, application container 622 can read the encrypted sensitive data for use in performing operations for an application. In this illustrative example, these components can automate the suppling of encrypted sensitive data to pod 614 for use by application container 622. Further, these components also update encrypted sensitive data stored in volume 620 in response to changes detected in the sensitive data. Further, additional flexibility can be employed through the use of external encryption algorithm 618 to encrypt the sensitive data.

Figure 7:
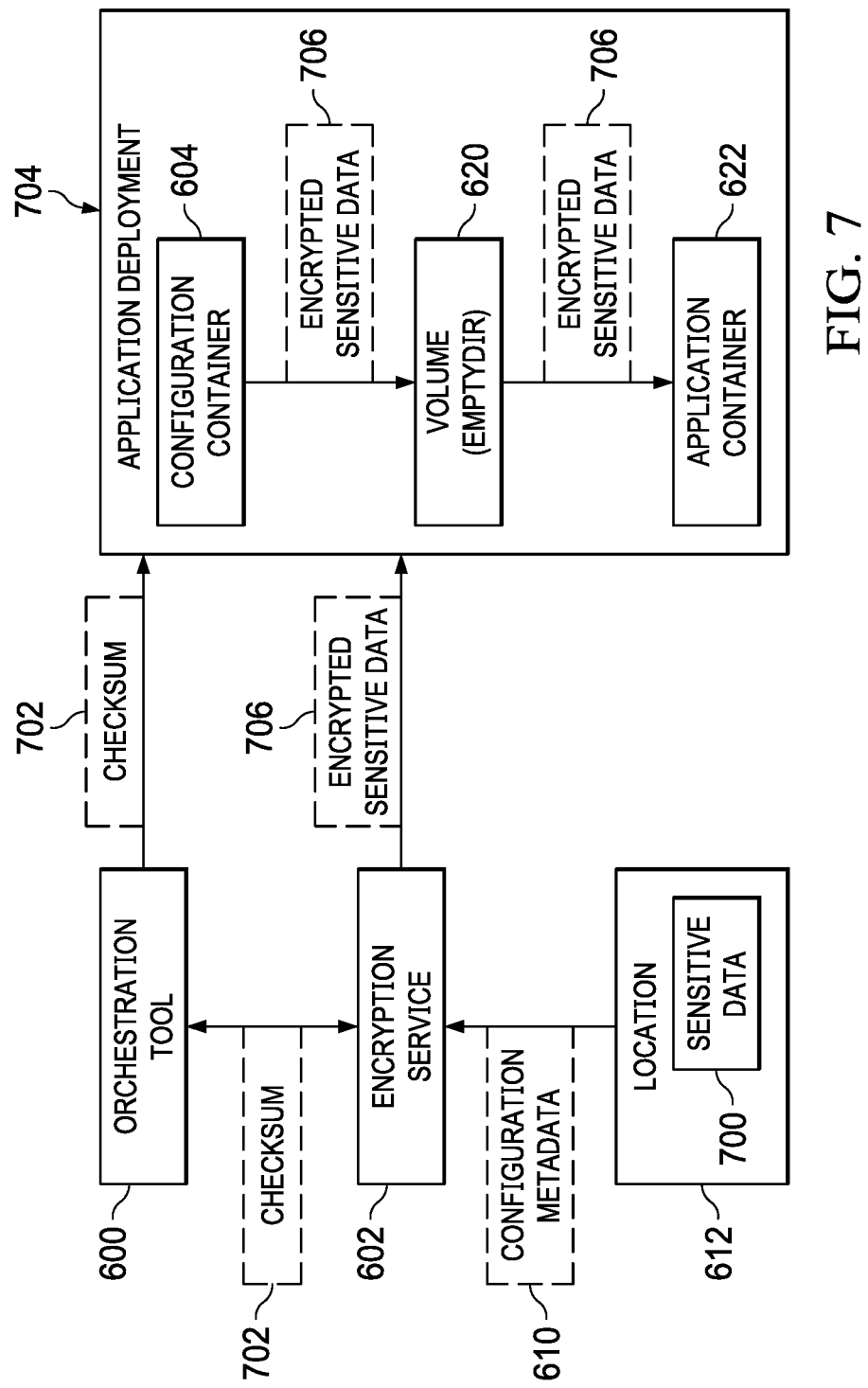
FIG. 7 is a dataflow diagram for managing sensitive data in accordance with an illustrative embodiment.

With reference now to FIG. 7, a dataflow diagram for managing sensitive data is depicted in accordance with an illustrative embodiment. In the illustrative examples, the same reference numeral may be used in more than one figure. This reuse of a reference numeral in different figures represents the same element in the different figures.

In this illustrative example, encryption service 602 reads configuration metadata 610 identifying sensitive data 700 in location 612. Encryption service 602 generates and returns checksum 702 to orchestration tool 600. As depicted, orchestration tool 600 can send checksum 702 to application deployment 704, which manages containers in a pod for an application. In this example, checksum 702 is stored in application deployment 704 and can be used in a later time to determine whether sensitive data 700 has changed.

As depicted, in response to receiving a request for encrypted sensitive data 706 from configuration container 604, encryption service 602 encrypts sensitive data 700 to form encrypted sensitive data 706 and sends encrypted sensitive data 706 to configuration container 604. Configuration container 604 stores encrypted sensitive data 706 in volume 620. In this example, application container 622 has access to volume 620 and can load and use encrypted sensitive data 706.

Turning to FIG. 8, an illustration of configuration information is depicted in accordance with an illustrative embodiment. In this illustrative example, configuration information 800 is an example of one implementation for configuration information 414 in FIG. 4 and configuration metadata 610 in FIG. 6. As depicted, configuration information 800 defines objects in section 802 and section 804. These objects are the location in which sensitive data can be found.

In this illustrative example, line 805 in section 802 identifies sensitive data as being located in an object in the form of a secret. Line 806 indicates the path to the secret. The attribute in line 808 identifies the types of sensitive data located in the secret. Line 810 identifies the variable names used for the types of sensitive data used by an application container. Line 812 identifies encryption algorithm for encrypting the sensitive data. In this example, the encryption algorithm is AES.

Section 804 identifies another object in the form of a configmap in line 814. This this object access using the path in line 816. The attribute list in line 818 identifies the types of sensitive data. Line 820 identifies the encryption algorithm. In this example, the encryption algorithm is hash.

Configuration information 800 is only meant as an example and not intended to limit the manner in which configuration information can be implemented in other embodiments. For example, configuration information 800 may reference one object, three objects, seven objects, or some other number of objects in which sensitive data can be located for encryption and use by an application container. In another illustrative example, configuration information 800 may be in the form of a table in a database.

Figure 9:
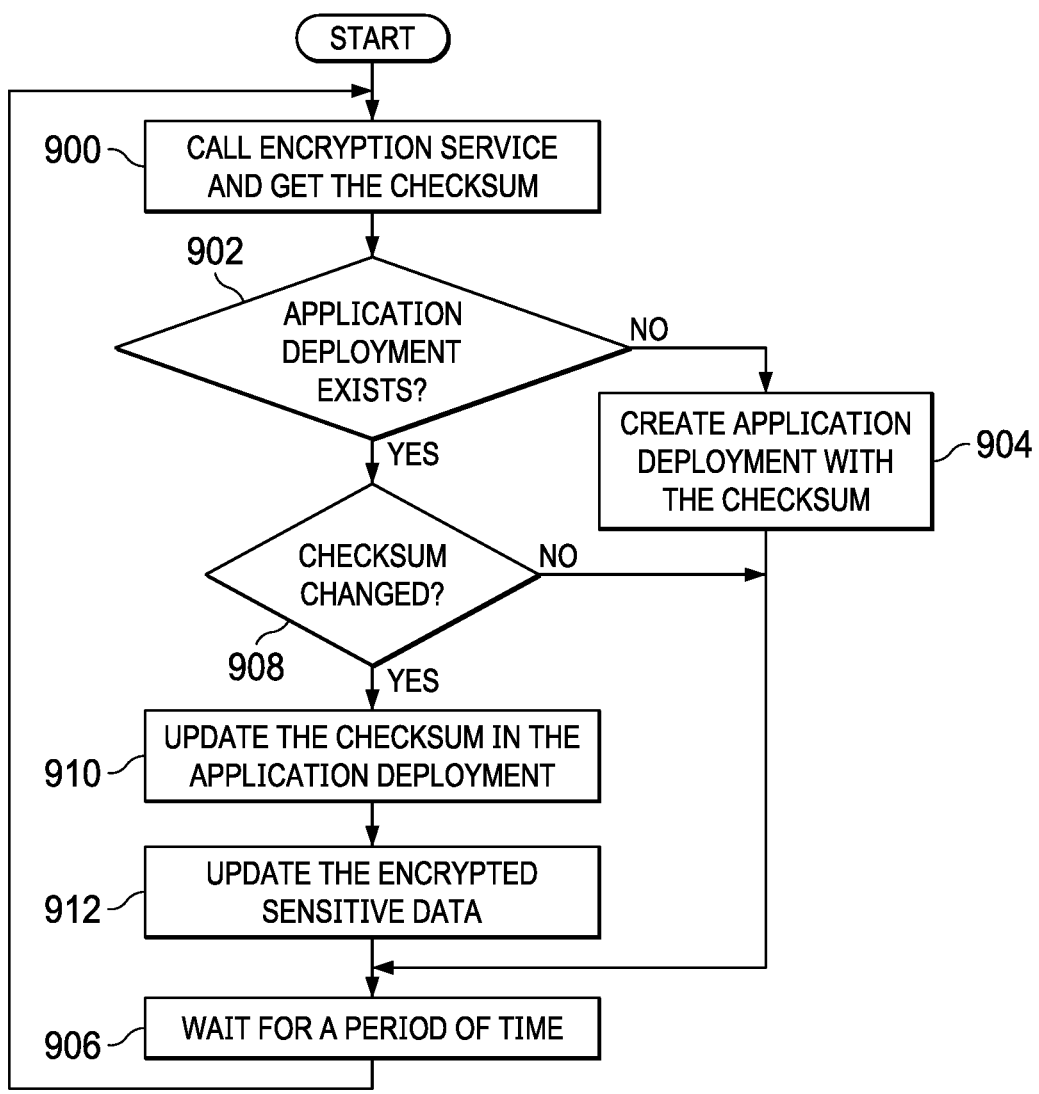
FIG. 9 is a flowchart of a process for creating an application deployment in accordance with an illustrative embodiment.

Turning to FIG. 9, a flowchart of a process for creating an application deployment is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in orchestration tool 500 in FIG. 5 and orchestration tool 600 in FIG. 6. This process can be initiated periodically or in response to an event.

The process begins by calling the encryption service and getting the checksum for the sensitive data (step 900). The process determines whether an application deployment exists (step 902). If an application deployment is not present the process creates the application deployment with the checksum (step 904). The process waits for a period of time (step 906) and then returns to step 900.

With reference again to step 902, if the application deployment exists, the process determines whether the checksum has changed (step 908). In step 908, the process has previously obtained the checksum and compares the checksum with the checksum obtained in step 902.

If the checksum has changed, the process updates the checksum in the application deployment (step 910). The process updates the encrypted sensitive data (step 912) and proceeds to step 906. With reference again to step 908, If the checksum has not changed, the process waits for a period of time (step 906).

Figure 10:
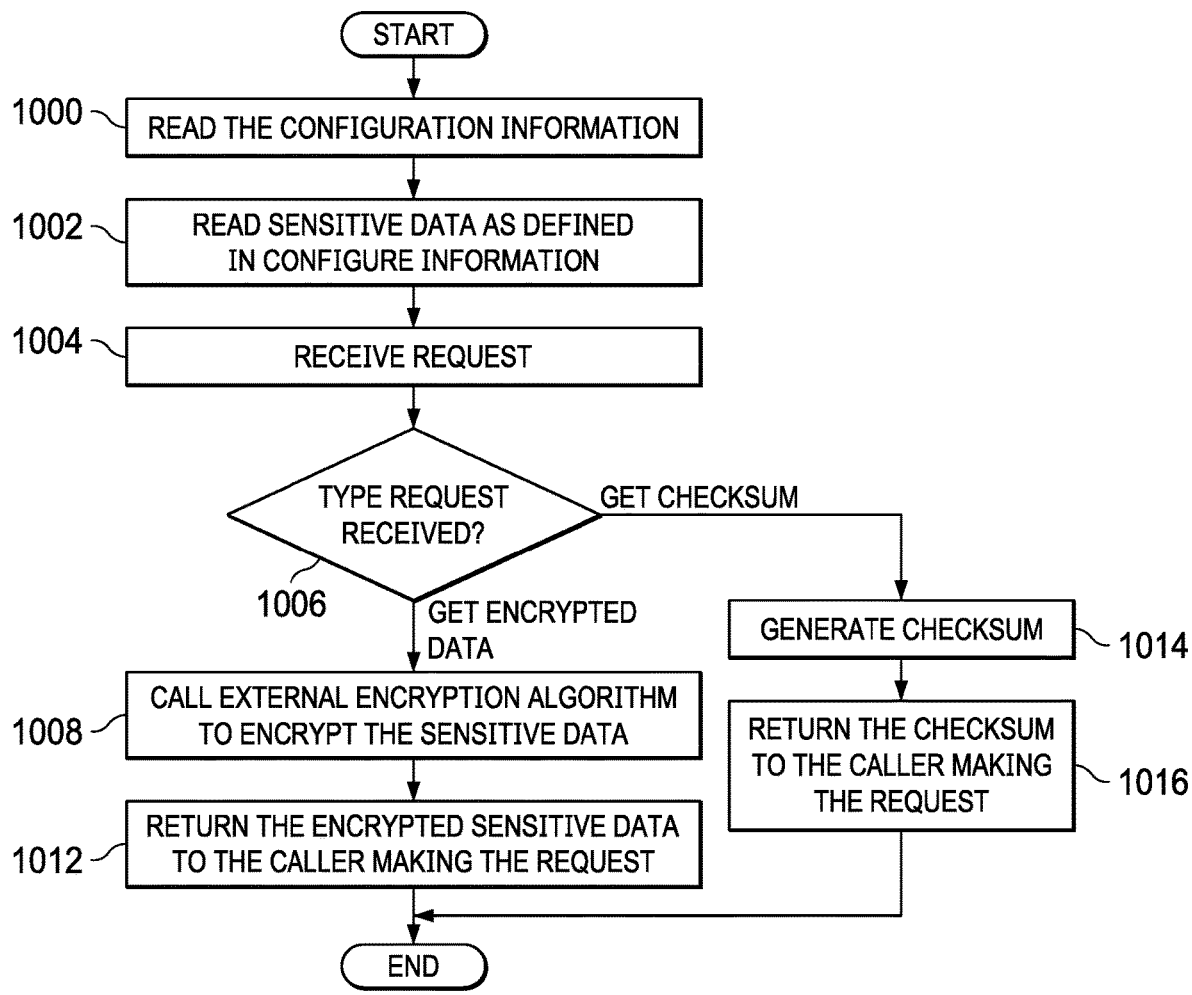
FIG. 10 is a flowchart of a process for managing sensitive data in accordance with an illustrative embodiment.

With reference to FIG. 10, a flowchart of a process for managing sensitive data is depicted in accordance with an illustrative embodiment. The process in FIG. 10 can be implemented in hardware, software, or both. When implemented in software, the process can take the form of program instructions that is run by one or more processor units located in one or more hardware devices in one or more computer systems. For example, the process can be implemented in encryption service 502 in FIG. 5 and in encryption service 602 in FIG. 6.

The process begins by reading the configuration information (step 1000). Process reads sensitive data as defined in the configuration information (step 1002). Process receives a request (step 1004) and determines the type of request (step 1006). If the type of request is get encrypted data, the process calls encryption service to encrypt the sensitive data (step 1008). The process then returns the encrypted sensitive data to the caller making the request (step 1012). The process terminates thereafter.

With reference again to step 1006, if the request is get checksum, the process generates a checksum using the sensitive data (step 1014). The process returns the checksum to the caller making the request (step 1016) with the process terminating thereafter.

Figure 11:
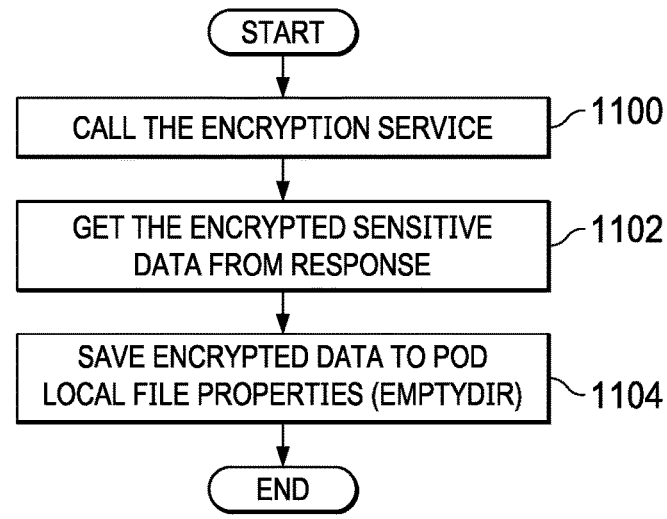
FIG. 11 is a flowchart of a process for obtaining encrypted sensitive data for an application container in accordance with an illustrative embodiment.

Turning now to FIG. 11, a flowchart of a process for obtaining encrypted sensitive data for an application container is depicted in accordance with an illustrative embodiment. The process in FIG. 11 can be implemented in hardware, software, or both. When implemented in software, the process can take the form of program instructions that is run by one or more processor units located in one or more hardware devices in one or more computer systems. For example, the process can be implemented in configuration container 504 in FIG. 5 and in configuration container 604 in FIG. 6.

The process begins by calling the encryption service (step 1100). In step 1100, the process sends a request to the encryption service to obtain encrypted sensitive data. The process receives encrypted sensitive data in a response from the encryption service (step 1102). The process saves encrypted sensitive data to a local properties file in a volume (step 1104). The process terminates thereafter.

Figure 12:
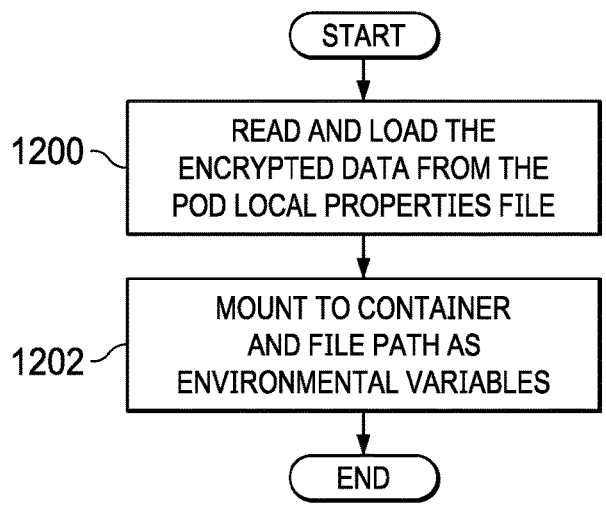
FIG. 12 is a flowchart of a process for accessing encrypted sensitive data for an application container in accordance with an illustrative embodiment.

With reference next to FIG. 12, a flowchart of a process for accessing encrypted sensitive data for an application container is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in an application container in application containers 408 in FIG. 4 and in application container 622 in FIG. 6.

The process begins by reading and loading the encrypted sensitive data from the local properties file in the volume (step 1200). The process then mounts the encrypted sensitive data to the container and file path as environmental variables (step 1202). The process terminates thereafter.

Figure 13:
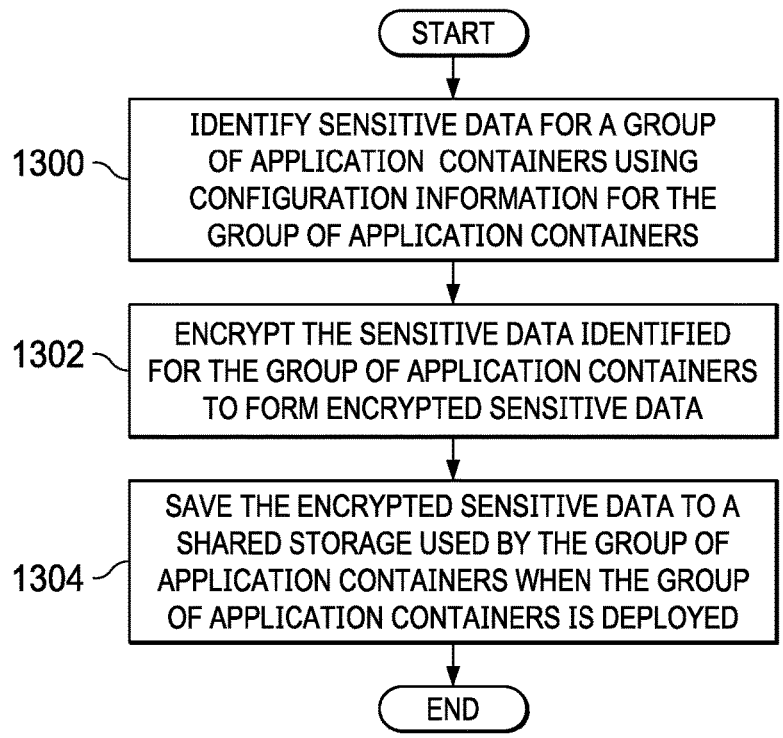
FIG. 13 is a flowchart of a process for managing sensitive data in accordance with an illustrative embodiment.

Turning next to FIG. 13, a flowchart of a process for managing sensitive data is depicted in accordance with an illustrative embodiment. The process in FIG. 13 can be implemented in hardware, software, or both. When implemented in software, the process can take the form of program instructions that is run by one or more processor units located in one or more hardware devices in one or more computer systems. For example, the process can be implemented in container manager 406 in computer system 404 in FIG. 4.

The process begins by identifying sensitive data for a group of application containers using configuration information for the group of application containers (step 1300). The process encrypts the sensitive data identified for the group of application containers to form encrypted sensitive data (step 1302).

The process saves the encrypted sensitive data to a shared storage used by the group of application containers when the group of application containers is deployed (step 1304). The process terminates thereafter.

Figure 14:
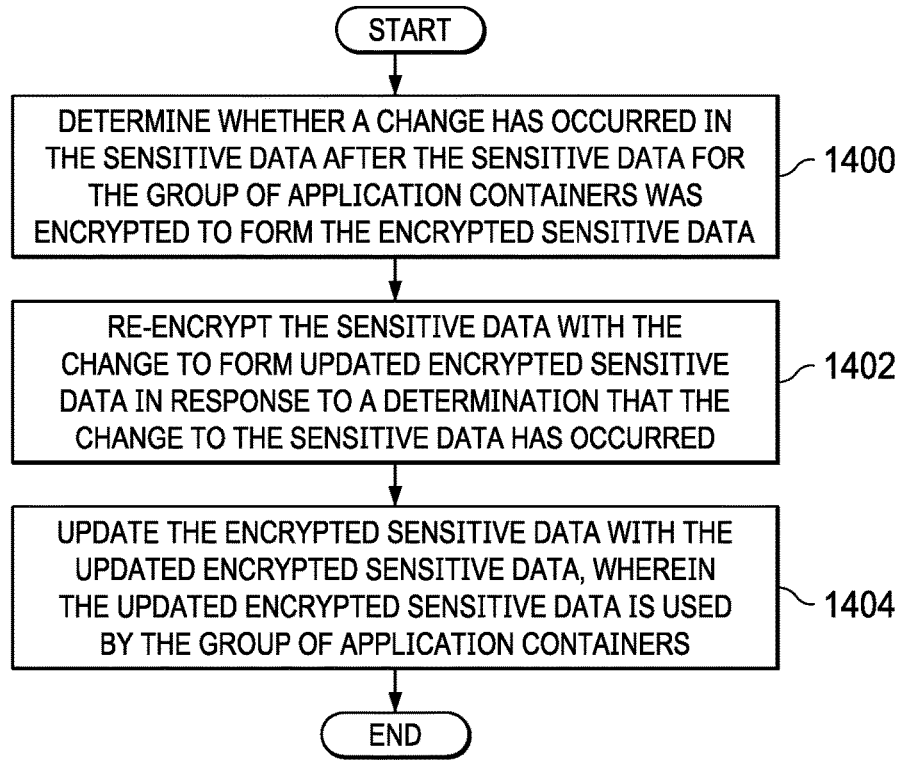
FIG. 14 is a flowchart of a process for managing sensitive data in accordance with an illustrative embodiment.

With reference to FIG. 14, a flowchart of a process for managing sensitive data is depicted in accordance with an illustrative embodiment. The process in FIG. 14 is example of additional steps that can be performed with the steps in the flowchart in FIG. 13. The steps in this flowchart can be performed after step 1304.

The process determines whether a change has occurred in the sensitive data after the sensitive data for the group of application containers was encrypted to form the encrypted sensitive data (step 1400). Then re-encrypts the sensitive data with the change to form updated encrypted sensitive data in response to a determination that the change to the sensitive data has occurred (step 1402).

The process updates the encrypted sensitive data with the updated encrypted sensitive data, wherein the updated encrypted sensitive data is used by the group of application containers (step 1404). The process terminates thereafter.

With reference again to step 1400, if a change has not occurred in the sensitive data, the process terminates. These steps can be performed repeatedly to update the encrypted sensitive data used by the group of application containers.

Figure 15:
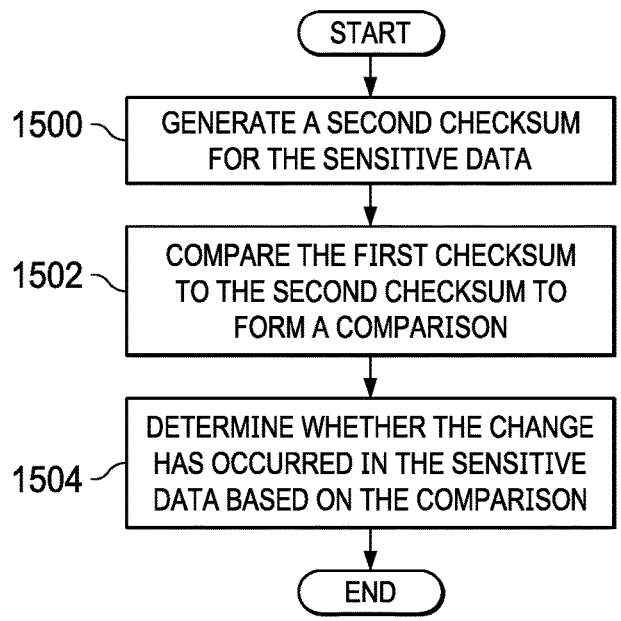
FIG. 15 is a flowchart of a process for determining whether sensitive data has changed in accordance with an illustrative embodiment.

Turning to FIG. 15, a flowchart of a process for determining whether sensitive data has changed is depicted in accordance with an illustrative embodiment. The process in this flowchart is an example of an implementation for step 1400 in FIG. 14. In this illustrative example, a first checksum is generated for the sensitive data prior to encrypting the sensitive data.

The process generates a second checksum for the sensitive data (step 1500). The process compares the first checksum to the second checksum to form a comparison (step 1502).

The process determines whether the change has occurred in the sensitive data based on the comparison (step 1504). The process terminates thereafter.

Figure 16:
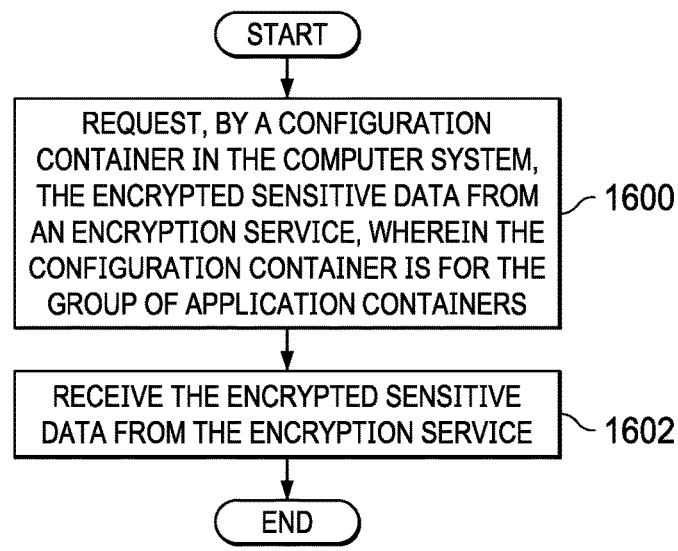
FIG. 16 is a flowchart of a process for managing sensitive data in accordance with an illustrative embodiment.

With reference to FIG. 16, a flowchart of a process for managing sensitive data is depicted in accordance with an illustrative embodiment. The process in FIG. 16 is an example of additional steps that can be performed with the steps in the flowchart in FIG. 13. In this depicted example, these steps can be performed by configuration container 504 in FIG. 5 and by configuration container 604 in FIG. 6. The configuration container can be located in the same pod in which the application containers are deployed.

The process requests, by a configuration container in the computer system, the encrypted sensitive data from an encryption service, wherein the configuration container is for the group of application containers (step 1600). The process receives the encrypted sensitive data from the encryption service (step 1602). The configuration container saves the encrypted sensitive data received in step 1602 to a shared storage for use by the group of application containers. The process terminates thereafter.

Figure 17:
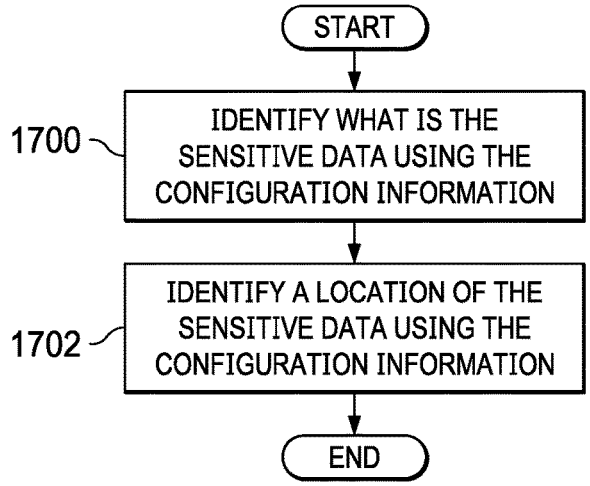
FIG. 17 is a flowchart of a process for identifying sensitive data in accordance with an illustrative embodiment.

With reference to FIG. 17, a flowchart of a process for identifying sensitive data is depicted in accordance with an illustrative embodiment. The process in FIG. 17 is an example an implementation for step 1300 in FIG. 13.

The process identifies what is the sensitive data using the configuration information (step 1700). The process identifies a location of the sensitive data using the configuration information (step 1702). The process terminates thereafter.

Figure 18:
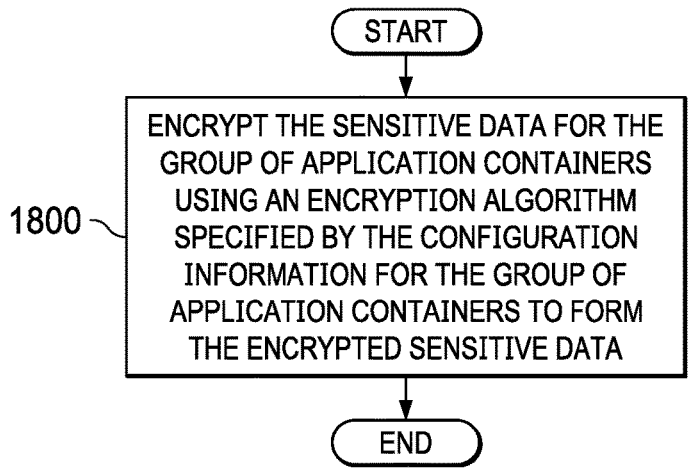
FIG. 18 is a flowchart of a process for encrypting sensitive data in accordance with an illustrative embodiment.

With reference to FIG. 18, a flowchart of a process for encrypting sensitive data is depicted in accordance with an illustrative embodiment. The process in FIG. 18 is an example of an implementation for 1302 in FIG. 13.

The process encrypts the sensitive data for the group of application containers using an encryption algorithm specified by the configuration information for the group of application containers to form the encrypted sensitive data (step 1800). The process terminates thereafter.

Figure 19:
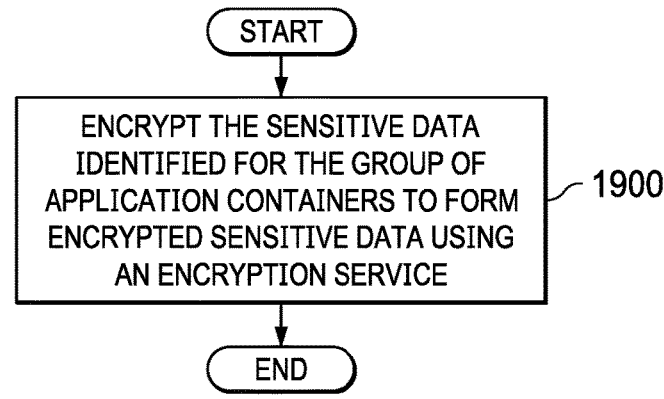
FIG. 19 is a flowchart of a process for encrypting sensitive data in accordance with an illustrative embodiment.

With reference to FIG. 19, a flowchart of a process for encrypting sensitive data is depicted in accordance with an illustrative embodiment. The process in FIG. 19 is an example of an implementation for 1302 in FIG. 13.

The process encrypts the sensitive data identified for the group of application containers to form encrypted sensitive data using an encryption service (step 1900). The process terminates thereafter.

Figure 20:
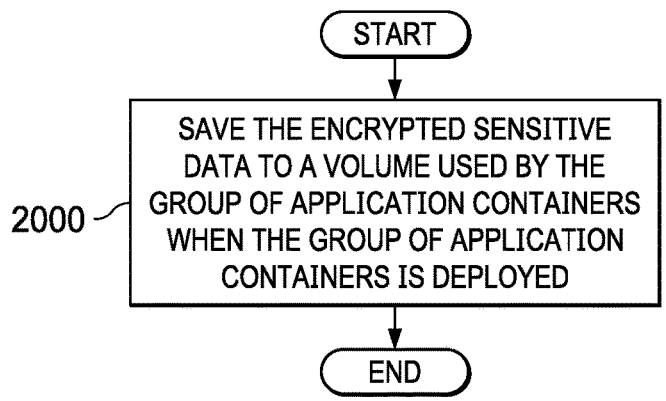
FIG. 20 is a flowchart of a process for saving encrypted sensitive data in accordance with an illustrative embodiment.

Turning next FIG. 20, a flowchart of a process for saving encrypted sensitive data is depicted in accordance with an illustrative embodiment. The process in FIG. 20 is an example of an implementation for step 1304 in FIG. 13.

The process saves the encrypted sensitive data to a volume used by the group of application containers when the group of application containers is deployed (step 2000). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 21:
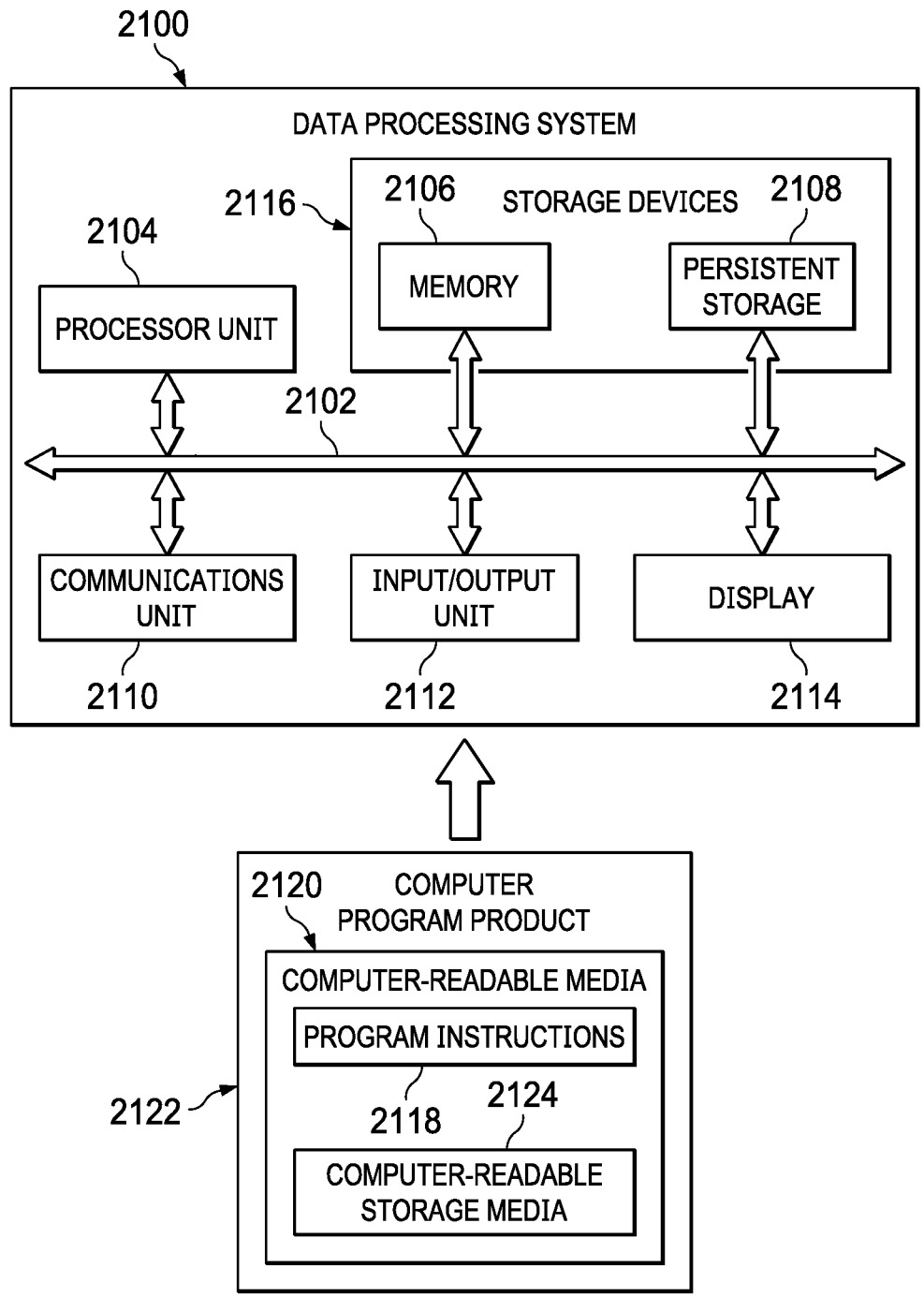
FIG. 21 is a block diagram of a data processing system in accordance with an illustrative embodiment.

Turning now to FIG. 21, a block diagram of a data processing system is depicted in accordance with an illustrative embodiment. Data processing system 2100 can be used to implement cloud computing nodes 110 in FIG. 1, personal digital assistant (PDA) or smart phone 120A, desktop computer 120B, laptop computer 120C, and/or automobile computer system 120N in FIG. 1. Data processing system 2100 can be used to implement computers in hardware and software layer 202 in FIG. 2 as well as server computer 304, server computer 306, and client devices 310 in FIG. 3. Data processing system 2100 can also be used to implement computer system 404 in FIG. 4. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 takes the form of a bus system.

Processor unit 2104 serves to execute instructions for software that can be loaded into memory 2106. Processor unit 2104 includes one or more processors. For example, processor unit 2104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2104 can may be implemented using one or more heterogeneous processor systems in which a main processor is present with secondary processors on a single chip. As another illustrative example, processor unit 2104 can be a symmetric multi-processor system containing multiple processors of the same type on a single chip.

Memory 2106 and persistent storage 2108 are examples of storage devices 2116. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, can be, for example, a random-access memory or any other suitable volatile or non-volatile storage device. Persistent storage 2108 may take various forms, depending on the particular implementation.

For example, persistent storage 2108 may contain one or more components or devices. For example, persistent storage 2108 can be a hard drive, a solid-state drive (SSD), a flash memory, a rewritable optical disk, a rewritable magnetic tape, or some combination of the above. The media used by persistent storage 2108 also can be removable. For example, a removable hard drive can be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that can be connected to data processing system 2100. For example, input/output unit 2112 may provide a connection for user input through at least one of a keyboard, a mouse, or some other suitable input device. Further, input/output unit 2112 may send output to a printer. Display 2114 provides a mechanism to display information to a user.

Instructions for at least one of the operating system, applications, or programs can be located in storage devices 2116, which are in communication with processor unit 2104 through communications framework 2102. The processes of the different embodiments can be performed by processor unit 2104 using computer-implemented instructions, which may be located in a memory, such as memory 2106.

These instructions are referred to as program instructions, computer usable program instructions, or computer-readable program instructions that can be read and executed by a processor in processor unit 2104. The program instructions in the different embodiments can be embodied on different physical or computer-readable storage media, such as memory 2106 or persistent storage 2108.

Program instructions 2118 is located in a functional form on computer-readable media 2120 that is selectively removable and can be loaded onto or transferred to data processing system 2100 for execution by processor unit 2104. Program instructions 2118 and computer-readable media 2120 form computer program product 2122 in these illustrative examples. In the illustrative example, computer-readable media 2120 is computer-readable storage media 2124.

Computer-readable storage media 2124 is a physical or tangible storage device used to store program instructions 2118 rather than a medium that propagates or transmits program instructions 2118. Computer readable storage media 2124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2118 can be transferred to data processing system 2100 using a computer-readable signal media. The computer-readable signal media are signals and can be, for example, a propagated data signal containing program instructions 2118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2120" can be singular or plural. For example, program instructions 2118 can be located in computer-readable media 2120 in the form of a single storage device or system. In another example, program instructions 2118 can be located in computer-readable media 2120 that is distributed in multiple data processing systems. In other words, some instructions in program instructions 2118 can be located in one data processing system while other instructions in program instructions 2118 can be located in another data processing system. For example, a portion of program instructions 2118 can be located in computer-readable media 2120 in a server computer while another portion of program instructions 2118 can be located in computer-readable media 2120 located in a set of client computers.

The different components illustrated for data processing system 2100 are not meant to provide architectural limitations to the manner in which different embodiments can be implemented. In some illustrative examples, one or more of the components may be incorporated in or otherwise form a portion of, another component. For example, memory 2106, or portions thereof, may be incorporated in processor unit 2104 in some illustrative examples. The different illustrative embodiments can be implemented in a data processing system including components in addition to or in place of those illustrated for data processing system 2100. Other components shown in FIG. 21 can be varied from the illustrative examples shown. The different embodiments can be implemented using any hardware device or system capable of running program instructions 2118.

Thus, illustrative embodiments provide a computer-implemented method, computer system, and computer program product for managing sensitive data used by containers and applications. In one illustrative example, configuration information identifies sensitive data used in an application container in a pod. This configuration information is used to locate and encrypt the sensitive data to form encrypted sensitive data. The encrypted sense data is saved in a shared storage within the pod that can be accessed by the application container.

In one illustrative example, a configuration container is included in the deployment of the pod. The configuration container begins running to obtain and save encrypted sensitive data in the shared storage. This process can occur before the application can run.

Further, in some illustrative examples, the sensitive data used to form encrypted sensitive data can be checked to determine whether changes have occurred. Responsive to a change in the sensitive data, the sensitive data can be re-encrypted to form updated encrypted sensitive data. This updated encrypted sensitive data can be used to update encrypted sensitive data in the shared storage.

As a result, one or more illustrative examples enable automating the management of sensitive data in a manner that reduces or avoids having to change the code for deploying application containers. Further, one or more illustrative examples can update sensitive data when changes occur while the application containers are running. In the illustrative examples, the updates can occur without needing to restart or re-deploy the application containers. As a result, sensitive data can be managed automatically reducing errors and issues involved with current techniques that involve recoding an application deployment.

Further, the illustrative examples increase security by protecting sensitive data without exposing sensitive data as environmental variables by placing encrypted sensitive data within the shared storage. Further, encryption of sensitive data can occur automatically using configuration containers. Further, increased compatibility occurs with the ability to automatically handle sensitive data changes that occurred during upgrades. The illustrative examples also can reduce the error rate of current techniques using complex logic code to handle key encryption key, algorithms, and multiple sensitive data values.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for managing sensitive data, the method comprising:
   identifying, by a computer system, the sensitive data for a group of application containers using configuration information for the group of application containers;
   encrypting, by the computer system, the sensitive data identified for the group of application containers and forming encrypted sensitive data;
   requesting, by a configuration container in the computer system, the encrypted sensitive data from an encryption service, wherein the configuration container is deployed and runs before the group of application containers;
   saving, by the configuration container in the computer system, the encrypted sensitive data to a shared storage used by the group of application containers when the group of application containers is deployed;
   determining, by the computer system, whether a change has occurred in the sensitive data identified for the group of application containers using the configuration information for the group of application containers after the sensitive data for the group of application containers was encrypted to form the encrypted sensitive data;
   re-encrypting, by the computer system, the sensitive data for the group of application containers with the change and forming updated encrypted sensitive data in response to a determination that the change to the sensitive data for the group of application containers has occurred; and
   updating, by the computer system, the encrypted sensitive data with the updated encrypted sensitive data, wherein the updated encrypted sensitive data is used by the group of application containers.

2. The computer-implemented method of claim 1, wherein the sensitive data identified for the group of application containers using the configuration information for the group of application containers has a first checksum generated prior to encrypting the sensitive data to form the encrypted sensitive data and wherein determining, by the computer system, whether the change has occurred in the sensitive data after the sensitive data for the group of application containers was encrypted to form the encrypted sensitive data comprises:
   generating, by the computer system, a second checksum for the sensitive data; and
   comparing, by the computer system, the first checksum to the second checksum to form a comparison.

3. The computer-implemented method of claim 2, further comprising determining whether the change has occurred in the sensitive data based on the comparison, wherein re-encrypting, by the computer system, the sensitive data for the group of application containers with the change to form the updated encrypted sensitive data in response to the determination that the change to the sensitive data has occurred comprises re-encrypting, by the computer system, the sensitive data for the group of application containers to form the updated encrypted sensitive data in response to the determination that the change to the sensitive data for the group of application containers has occurred using the comparison.

4. The computer-implemented method of claim 1 further comprising:
   receiving, by the configuration container in the computer system, the encrypted sensitive data from the encryption service, wherein the configuration container saves the encrypted sensitive data to the shared storage for use by the group of application containers.

5. The computer-implemented method of claim 1, wherein saving the encrypted sensitive data is performed by a configuration container configured to manage the encrypted sensitive data, and further comprising:
   loading, by the computer system, the encrypted sensitive data from the shared storage for use by an application container in the group of application containers.

6. The method of claim 1, wherein identifying, by the computer system, the sensitive data for the group of application containers using the configuration information for the group of application containers comprises:

identifying, by the computer system, what is the sensitive data for the group of application containers using the configuration information for the group of application containers; and identifying, by the computer system, a location of the sensitive data for the group of application containers using the configuration information for the group of application containers, wherein the location of the sensitive data for the group of application containers specifies a plurality of objects in which the sensitive data is located.

7. The computer-implemented method of claim 1, wherein encrypting, by the computer system, the sensitive data for the group of application containers to form the encrypted sensitive data further comprises:

encrypting, by the computer system, the sensitive data for the group of application containers using an encryption algorithm specified by the configuration information for the group of application containers to form the encrypted sensitive data.

8. The computer-implemented method of claim 1, wherein encrypting, by the computer system, the sensitive data for the group of application containers to form the encrypted sensitive data further comprises:

encrypting, by the computer system, the sensitive data identified for the group of application containers to form the encrypted sensitive data using an external encryption service.

9. The computer-implemented method of claim 1, wherein saving, by the computer system, the encrypted sensitive data to the shared storage used by the group of application containers when the group of application containers is deployed comprises:

saving, by the computer system, the encrypted sensitive data to a volume used by the group of application containers when the group of application containers is deployed.

10. The computer-implemented method of claim 1, wherein the configuration information for the group of application containers comprises a location of the sensitive data for the group of application containers, an identification of the sensitive data to encrypt, and an encryption algorithm for encrypting the sensitive data for the group of application containers, wherein the location of the sensitive data for the group of application containers specifies a plurality of objects in which the sensitive data is located.

11. A computer system that comprises:

a storage device that stores program instructions; and a number of processor units in communication with the storage device, wherein the number of processor units configured to execute program instructions to:

identify sensitive data for a group of application containers using configuration information for the group of application containers;

encrypt the sensitive data identified for the group of application containers to form encrypted sensitive data;

request the encrypted sensitive data from an encryption service using a configuration container, wherein the configuration container is deployed and runs before the group of application containers;

save the encrypted sensitive data to a shared storage using the configuration container, wherein the shared storage is used by the group of application containers when the group of application containers is deployed;

determine whether a change has occurred in the sensitive data identified for the group of application containers based upon the configuration information for the group of application containers after the sensitive data for the group of application containers was encrypted to form the encrypted sensitive data;

re-encrypt the sensitive data for the group of application containers with the change to form updated encrypted sensitive data in response to a determination that the change to the sensitive data for the group of application containers has occurred; and update the encrypted sensitive data with the updated encrypted sensitive data, wherein the updated encrypted sensitive data is used by the group of application containers.

12. The computer system of claim 11, wherein the sensitive data identified for the group of application containers using the configuration information for the group of application containers has a first checksum generated prior to encrypting the sensitive data to form the encrypted sensitive data and wherein determining whether the change has occurred in the sensitive data after the sensitive data for the group of application containers was encrypted to form the encrypted sensitive data, the number of processor units executes program instructions to:

generate a second checksum for the sensitive data; and compare the first checksum to the second checksum to form a comparison.

13. The computer system of claim 12, wherein the number of processor units executes are further configured to execute program instructions to:

determine the change has occurred in the sensitive data based on the comparison, wherein in re-encrypting, by the computer system, the sensitive data for the group of application containers with the change to form updated encrypted sensitive data in response to the determination that the change to the sensitive data has occurred; and re-encrypt the sensitive data for the group of application containers to form the updated encrypted sensitive data in response to the determination that the change to the sensitive data for the group of application containers has occurred using the comparison.

14. The computer system of claim 11, wherein the number of processor units are further configured to execute program instructions to:

receive, by the configuration container, the encrypted sensitive data from the encryption service, wherein the configuration container saves the encrypted sensitive data to the shared storage for use by the group of application containers.

15. The computer system of claim 11, wherein saving the encrypted sensitive data is performed by a configuration container configured to manage the encrypted sensitive data, and wherein the number of processor units executes program instructions to:

load the encrypted sensitive data from the shared storage for use by an application container in the group of application containers.

16. The computer system of claim 11, wherein in identifying the sensitive data for the group of application containers using the configuration information for the group of application containers, the number of processor units executes program instructions to:

identify what is the sensitive data for the group of application containers using the configuration information for the group of application containers; and identify a location of the sensitive data for the group of application containers using the configuration information for the group of application containers, wherein the location of the sensitive data for the group of application containers specifies a plurality of objects in which the sensitive data is located.

17. The computer system of claim 11, wherein in encrypting the sensitive data for the group of application containers to form the encrypted sensitive data further, the number of processor units executes program instructions to:

encrypt the sensitive data for the group of application containers using an encryption algorithm specified by the configuration information for the group of application containers to form the encrypted sensitive data.

18. The computer system of claim 11, wherein in encrypting the sensitive data for the group of application containers to form the encrypted sensitive data, the number of processor units executes program instructions to:

encrypt the sensitive data identified for the group of application containers to form the encrypted sensitive data using an external encryption service.

19. A computer program product configured to manage sensitive data, wherein the computer program product comprises comprising: a computer readable storage medium that comprises program instructions embodied therewith and configured for execution by a computer system to cause the computer system to perform a method of:

identifying, by a computer system, the sensitive data for a group of application containers using configuration information for the group of application containers;

encrypting, by the computer system, the sensitive data identified for the group of application containers and forming encrypted sensitive data;

requesting, by a configuration container in the computer system, the encrypted sensitive data from an encryption service, wherein the configuration container is deployed and runs before the group of application containers; and saving, by the configuration container in the computer system, the encrypted sensitive data to a shared storage used by the group of application containers when the group of application containers is deployed;

determining, by the computer system, whether a change has occurred in the sensitive data identified for the group of application containers using the configuration information for the group of application containers after the sensitive data for the group of application containers was encrypted to form the encrypted sensitive data;

re-encrypting, by the computer system, the sensitive data for the group of application containers with the change and forming updated encrypted sensitive data in response to a determination that the change to the sensitive data for the group of application containers has occurred; and updating, by the computer system, the encrypted sensitive data with the updated encrypted sensitive data, wherein the updated encrypted sensitive data is used by the group of application containers.

20. The computer program product of claim 19, wherein the group of application containers is a plurality of application containers.

\* \* \* \* \*